Dec. 1, 1953 — J. MORTKA — 2,661,168

WING MOUNTING FOR HELICOPTER-AIRPLANES

Original Filed Aug. 31, 1948 — 5 Sheets-Sheet 1

INVENTOR.
JOHN MORTKA
BY
ATTORNEY

Dec. 1, 1953      J. MORTKA      2,661,168

WING MOUNTING FOR HELICOPTER-AIRPLANES

Original Filed Aug. 31, 1948      5 Sheets-Sheet 2

INVENTOR.
JOHN MORTKA

Dec. 1, 1953 J. MORTKA 2,661,168
WING MOUNTING FOR HELICOPTER-AIRPLANES
Original Filed Aug. 31, 1948 5 Sheets-Sheet 3

INVENTOR.
JOHN MORTKA
BY
ATTORNEY

Dec. 1, 1953 J. MORTKA 2,661,168
WING MOUNTING FOR HELICOPTER-AIRPLANES
Original Filed Aug. 31, 1948 5 Sheets-Sheet 4

INVENTOR.
JOHN MORTKA
BY
ATTORNEY

Dec. 1, 1953     J. MORTKA     2,661,168
WING MOUNTING FOR HELICOPTER-AIRPLANES
Original Filed Aug. 31, 1948     5 Sheets-Sheet 5

INVENTOR.
JOHN MORTKA
BY
ATTORNEY

Patented Dec. 1, 1953

2,661,168

UNITED STATES PATENT OFFICE

2,661,168

WING MOUNTING FOR HELICOPTER-AIRPLANES

John Mortka, Brooklyn, N. Y.

Substituted for abandoned application Serial No. 47,080, August 31, 1948. This application January 23, 1953, Serial No. 332,809

8 Claims. (Cl. 244—49)

This invention relates to new and useful improvements in an aircraft. This is a substitute for my abandoned application, filed on August 31, 1948, Serial Number 47,080.

More particularly, the present invention proposes the construction of a new and improved aircraft characterized by a fuselage provided with wings pivotally attached to the fuselage and arranged to be extended laterally from the sides of the fuselage when the aircraft is being powered by a propeller on the front end of the fuselage in a manner to produce the usual lift as in a conventionally constructed aircraft.

Still another object of the present invention proposes the provision of struts pivotally attached to the wings and slidably extended through brackets mounted on the fuselage, which brackets are provided with latch members engageable with latch cutouts formed in the struts for holding the struts in positions in which the wings will be operatively extended from the sides of the fuselage or inoperatively depended along the sides of the aircraft.

A further object of the present invention proposes the provision of an electrical control system including solenoids operative on the pivotally mounted struts and arranged in a manner to draw the struts to move the wings from their operative positions extended laterally from the sides of the fuselage to their inoperative positions depended along the sides of the fuselage.

It is a further object of the present invention to construct a new and improved aircraft which is simple and durable, which is efficient in operation and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

The aircraft, in accordance with the present invention, includes a fuselage 20 provided with the usual entrance door 21 and windows 22. The fuselage 20 is supported by the usual undercarriage 23 and has wings 24 which are extendable laterally from the sides of the fuselage. The rear of the fuselage 20 is provided with a single tail surface 25.

The front of the fuselage 20 is provided with a propeller 26 arranged to be rotated in a vertical plane by a motor, not shown on the drawing, for creating the usual forward thrust to propel the aircraft in a forward direction.

Figure 1:
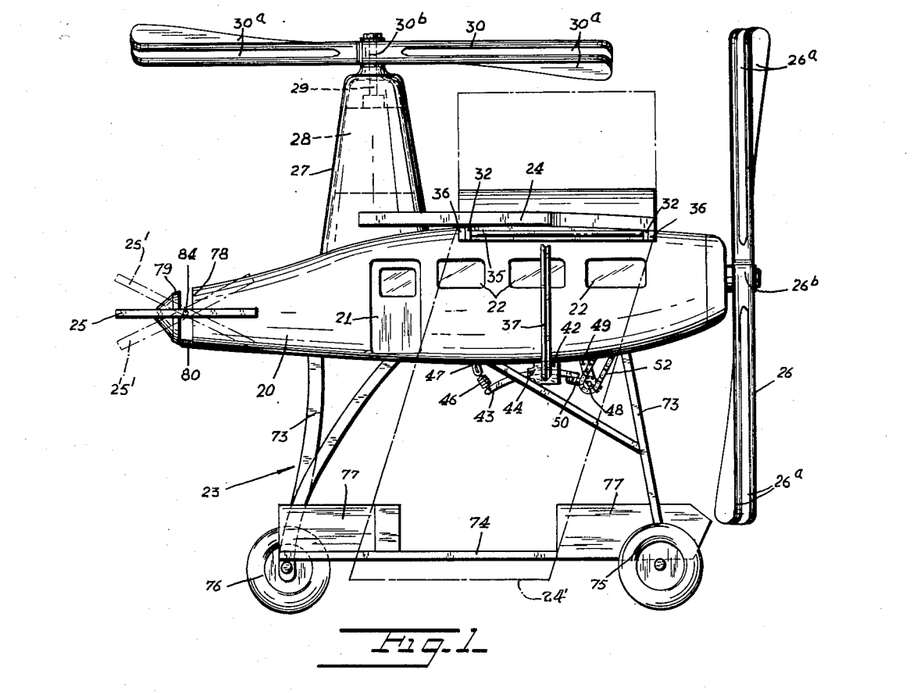
Fig. 1 is a side elevational view of the aircraft constructed in accordance with the present invention.

A housing 27 extends vertically from the fuselage 20, at the rear of the wings 24, and houses a motor 28, see Fig. 1. A driven shaft 29 extends vertically from the motor 28 and projects from the top of the housing 27 and carries on its upper end a rotor 30. Thus, the shaft 29 is rotated by the motor 28 to rotate the rotor 30 in a horizontal plane and create a vertical lift and drive the aircraft in a forward and backward direction as is known in conventionally constructed helicopters.

From the foregoing, it is apparent that the propeller 26 and the rotor 30 each have a separate source of power so that the pilot of the aircraft may at will switch from the propeller 26 to the rotor 30. The propeller 26 is constructed to have a pair of blades 26ª, arranged one behind the other, on opposite sides of the hub 26ᵇ of the propeller. The rotor 30 is similar in construction to the propeller 26 and has a pair of blades 30ª arranged one beneath the other, on opposite sides of the hub 30ᵇ, see Figs. 1 to 3. These constructions of the propeller 26 and 30 render the same more efficient and create the effect of having provided the fuselage 20 with two propellers and two rotors.

Figure 2:
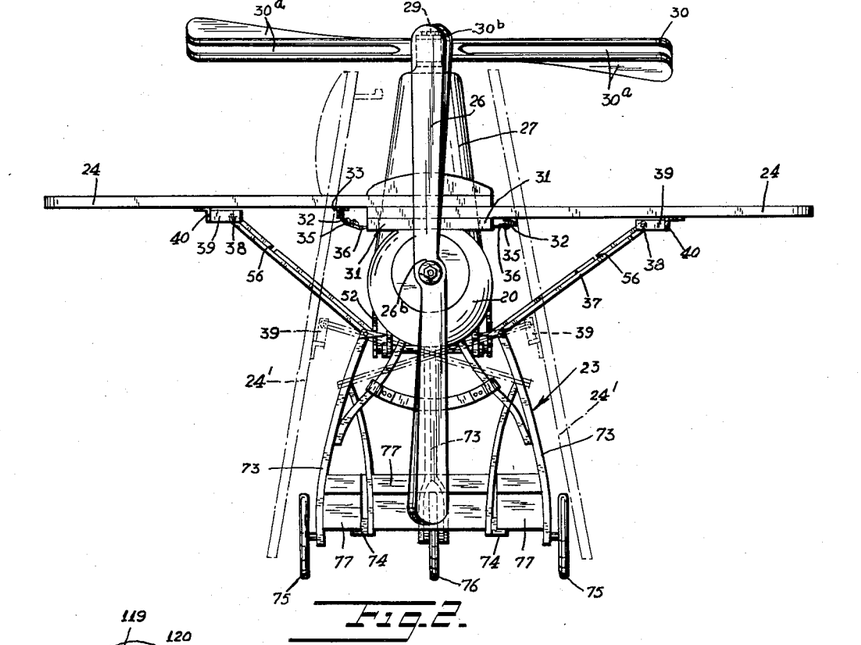
Fig. 2 is a front elevational view of Fig. 1.
Figures 3, 7, 16:
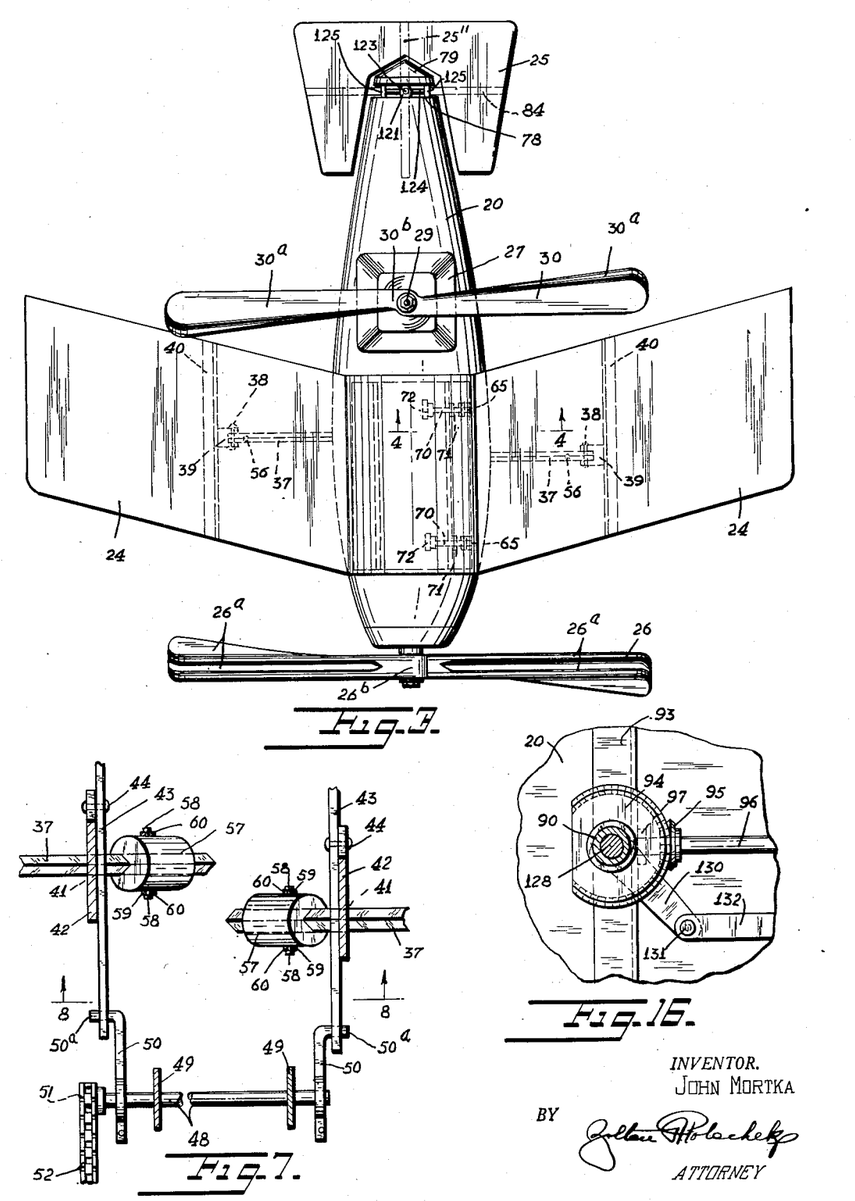
Fig. 3 is a top plan view of Fig. 1.
Fig. 7 is a horizontal sectional view taken on the line 7—7 of Fig. 6.
Fig. 16 is a horizontal sectional view taken on the line 16—16 of Fig. 11.

As previously indicated, the wings 24 are pivotally attached to the sides of the fuselage 20 and are to be extended laterally from the sides thereof as indicated by the full lines in Figs. 1 to 3, when the aircraft is being propelled by the propeller 26 to create the usual lift as in a conventionally constructed aircraft. However, when the aircraft is being propelled by the rotor 30, the wings 24 are to be pivoted to their inoperative positions depended along the sides of the fuselage 20, as indicated by the dot and dash lines 24' in Figs. 1 and 2.

Figure 4:
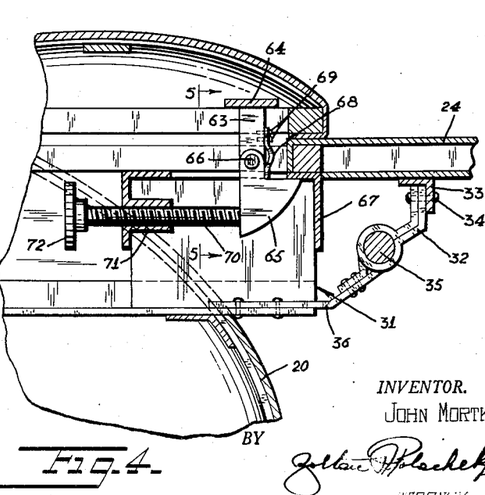
Fig. 4 is an enlarged partial transverse vertical sectional view taken on the line 4—4 of Fig. 3.

More particularly, the top of the fuselage 20 is provided with a rectangular frame 31, see Figs. 2 and 4, to which the wings are pivotally attached. Adjacent the fuselage 20, the wings 24 are provided with depending straps 32 which have their ends securely attached to L-shaped ribs 33 by means of rivets 34 and the ribs 33 are in turn mounted upon the bottom faces of the wings 24. The intermediate portions of the straps 32 are rotatively turned about rods 35 which are fixedly supported by brackets 36 mounted on the frame 31.

Means is provided for supporting the wings 24 in pivoted positions in which they extend laterally from the sides of the fuselage 20 as illustrated by the full lines in Figs. 1 to 3. This means is characterized by struts 37 which extend downwards and inwards at an angle. The upper ends of the struts 37 are pivotally supported by means of pins 38 upon bosses 39 mounted on ribs 40. The ribs 40 are in turn mounted upon the bottom faces of the wings 24 intermediate the ends thereof. As shown in Figs. 3 and 7, the struts 37 are longitudinally offset so that their bottom ends will not interfere with their movements, as will become clear as this specification proceeds.

Figure 8:
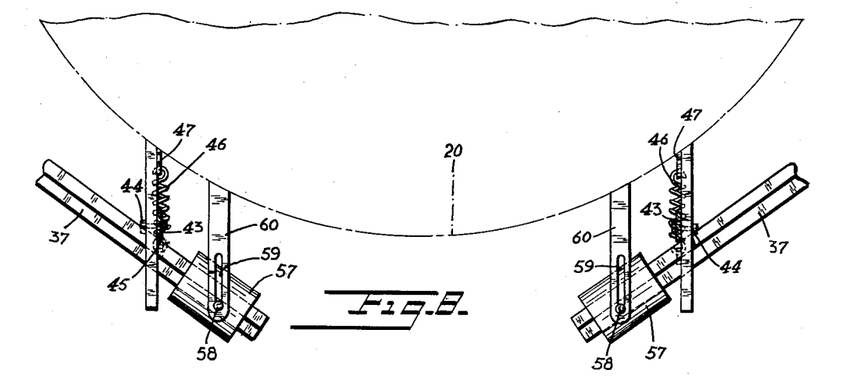
Fig. 8 is a partial transverse vertical sectional view taken on the line 8—8 of Fig. 7.
Figure 9:
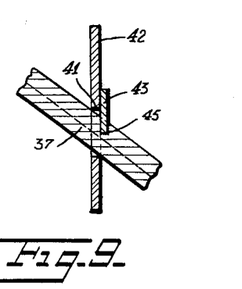
Fig. 9 is a partial transverse vertical sectional view taken on the line 9—9 of Fig. 6.

The bottom ends of the struts 37 are slidably extended through corresponding openings 41 formed in brackets 42 which depend from the fuselage 20. Latch members 43 are pivotally supported intermediate of their ends upon the brackets 42 by means of pins 44. The latch members 43 are disposed to engage complementary latch cutouts 45, see Figs. 8 and 9, for locking the struts 37 in fixed positions and for holding the wings 24 in positions extended laterally from the sides of the fuselage.

Contraction springs 46 are provided for urging the latch members 43 into positions in which they will retain their engaged positions with the latch cutouts 45 of the struts 37. There is one contraction spring 46 for each latch member 43, and each spring 46 has one end attached to the adjacent end of its respective latch member 43 and its other end attached to a fixed portion of the fuselage 20. As shown on the drawings, the fuselage 20 is provided with depending lugs 47 to which the other ends of the contraction springs 46 are attached.

Manually controllable means is provided for moving the latch members 43 in opposition to the pull created by the contraction springs 46 to disengage the latch members 43 from the latch cutouts 45 and free the struts 37 to slide in the openings 41 in the brackets 42, freeing the wings 24 to move from the full line positions shown in Figs. 1 to 3 to the inoperative positions depended along the sides of the fuselage 20, as illustrated by the dot and dash lines 24' in Figs. 1 and 2.

Figure 6:
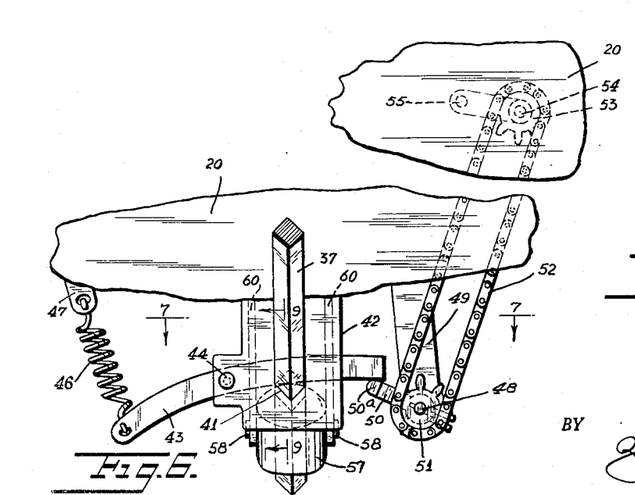
Fig. 6 is an enlarged detailed view of a portion of Fig. 1.

The manually controllable means referred to in the previous paragraph is characterized by a shaft 48 rotatively supported in brackets 49 which depend from the fuselage 20 at the free ends of the latch members 43 opposite the ends to which the contraction springs 46 are attached. Fixedly mounted on the shaft 48 outside the brackets 49 there is a pair of dogs 50, one for each of the latch members 43. Each of the dogs 50 has an out-turned end 50ᵃ, see Figs. 6 and 7, disposed beneath the free end of the respective latch member 43.

A sprocket wheel 51 is mounted on one end of the shaft 48 and engaged by a continuous sprocket chain 52 which extends into the fuselage 20 through an appropriate opening or openings provided for this purpose. Within the fuselage 20, the sprocket chain 52 engages over a second sprocket wheel 53 fixedly mounted on a stud shaft 54 rotatively supported in a suitable bearing fixedly mounted upon a fixed portion of the fuselage 20 adjacent the pilot's seat. Also mounted on the stud shaft 54 there is a handle 55 by which the stud shaft 54 can be turned, to turn the shaft 48, through the medium of the sprocket wheels 51 and 53 and the sprocket chain 52, and in turn raise the outturned ends 50ᵃ of the dogs 50 and pivot the latch members 43 against the action of the springs 46 moving the latch members clear of the latch cutouts 45 freeing the ends of the struts 37 to slide through the openings 41 formed in the brackets 42.

Adjacent their pivoted ends, the struts 37 are formed with latch cutouts 56, see Figs. 2 and 3, which are arranged to be engaged by the latch members 43 in the depended positions of the wings 24 for securing the wings 24 from flopping around when in their depended positions.

A manually controllable electrical means is provided for insuring that the wings 24 will move from their positions extended laterally from the sides of the aircraft to their positions depended inoperatively along the sides of the fuselage 20 when the aircraft is in flight.

This electrical movable means comprises solenoids 57 slidably mounted on the lower ends of the struts 37 between the brackets 42. Opposite sides of the solenoids 57 are formed with outwardly extending trunnions 58 which turnably and slidably engage complementary vertical slots 59 formed in supports 60 which depend from the bottom of the fuselage 20. This permits the solenoids to turn and slide vertically in accordance with forces imposed thereon by sliding of the struts 37 through the openings 41 in the brackets 42.

Figures 5, 10, 11, 15:
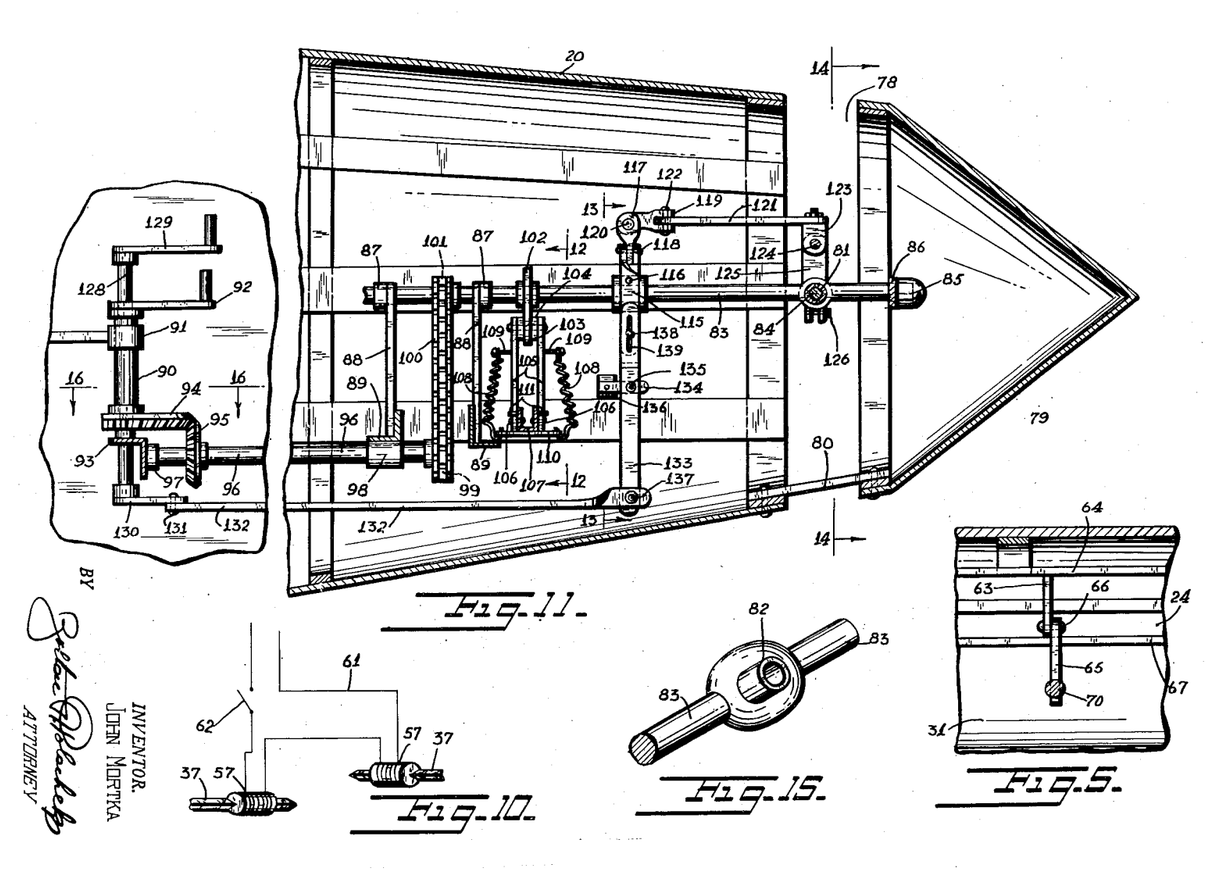
Fig. 5 is a partial longitudinal vertical sectional view taken on the line 5—5 of Fig. 4.
Fig. 10 is a schematic wiring diagram of the controls for the movement of the wings.
Fig. 11 is an enlarged longitudinal vertical sectional view through a portion of the fuselage of the aircraft.
Fig. 15 is a perspective view of a portion of the tail assembly.

As shown in Fig. 10, the solenoids 57 are connected in series in a circuit 61 including a source of electrical energy and a normally open manually closable switch 62. The switch 62 is located within the fuselage 20 adjacent the pilot's seat and is arranged to be closed by the pilot.

To lower the wings 24, the pilot first turns the handle 55 to rotate the shaft 48 to move the dogs 50 to pivot the latch members 43 against the action of the springs 46 and move the latch members 43 clear of the latch cutouts 45 in the struts 37. The pilot then closes the switch 62 to energize the solenoids 57 to pull downward on the struts 37 to pivot the wings 24 downwards. While the wings 24 are moving downwards, the pilot turns the handle 55 back to rotate the shaft 48 in the opposite direction and move the dogs 50 away from the ends of the latch members 43 freeing the latch members 43 to be returned to their starting positions by the springs 46. When the wings 24 reach their full downward pivoted positions, the latch cutouts 56 will then be aligned with the latch members 43, and the contraction springs 46 will snap the latch members 43 into those latch cutouts 56 locking the struts 37 against further movement in either direction and in turn securely locking the wings 24 in their inoperative positions depended along the sides of the fuselage 20.

An auxiliary means is provided for assisting the struts 37 and related mechanisms in holding the wings 24 in their operative positions extended laterally from the sides of the fuselage 20 of the aircraft.

In their operative positions extended laterally from the sides of the fuselage 20, the wings 24 have portions which overlap each other over the frame 31, as clearly illustrated in Figs. 2 and 4. The auxiliary holding means is comprised of fixed lugs 63, see Figs. 4 and 5, which depend from a fixed portion 64 of the topmost of the overlapped portions of the wings 24. Hooks 65 are pivotally supported upon the lower ends of the lugs 63 by means of pins 66. The hooks 65 are of a length to extend through the lowermost of the overlapped portions of the wings 24 and be engaged with a complementary fixed portion 67 of the frame 31, as shown in Fig. 4. Leaf springs 68 are fixedly attached at their ends to the lugs 63 by means of spaced pins 69, and the free ends of the leaf springs 68 engage the sides of the hooks 65 for retaining the hooks 65 in pivoted positions in which they will be disengaged from the fixed portion 67 of the frame 31. Hand rotative screws 70 are threadedly rotatively extended through complementary bushings 71 formed on the frame 31, one in alignment with each of the hooks 65. The inner ends of the screws 70 are formed with enlarged heads 72 by which the screws 70 may be turned for pivoting the hooks 65 against the action of their respective leaf springs 68 for pivoting the hooks 65 toward and engaging them with the fixed portion 67. Normally, the hooks 65 are in the engaged positions shown in Fig. 4, and the screws 70 are at a convenient location to be turned to move away from the hooks 65 freeing the hooks to be pivoted away from the fixed portion 67 by the leaf springs 68 freeing the wings to pivot downwards as previously described.

The undercarriage 23 includes a plurality of substantially vertically extending braces 73 which support at their lower ends a horizontal frame 74. The horizontal frame 74 is provided with a spaced pair of front wheels 75 and a single rear wheel 76 for supporting the aircraft on dry land. Mounted on the horizontal frame 74 adjacent each of the wheels 75 there is a float 77 for supporting the aircraft on water. The undercarriage 23 is of a sufficient height so that when the wheels 75 and 76 are resting on dry ground, the fuselage will be at a proper elevation so that the tip ends of the wings 24, when inoperatively depended along the sides of the fuselage 20, will not touch the dry ground as shown in Figs. 1 and 2.

The single tail surface 25 is universally supported to turn in a vertical plane extended longitudinally of the fuselage 20, as illustrated by the dot and dash lines 25′ in Fig. 1, and to turn in a vertical plane extended laterally of the fuselage 20, as illustrated by the dot and dash lines 25″ in Fig. 3. When the tail surface is horizontal and turned as illustrated by the dot and dash lines 25′ in Fig. 1, the tail surface acts to control ascending and descending of the aircraft when propelled by the propeller 26. However, when the tail surface 25 is turned to the vertical position illustrated by the dot and dash lines 25″ in Fig. 3, the tail surface 25 may also be turned, while in this vertical position, in one direction or the other for controlling turning and banking of the aircraft, when powered by the propeller 26. On the other hand, when the aircraft is being propelled by the rotor 30, then the tail surface 25 may be turned to the vertical position, illustrated by the dot and dash lines 25″ in Fig. 3, to retain the fuselage from turning in a horizontal plane under the influence of the turning torque created by the turning rotor 30.

The back end of the fuselage 20 is formed with a vertical slot 78 between the main portion of the fuselage 20 and a cone-like end portion 79 secured to the rear end of the main portion of the fuselage 20 by means of a single strap 80 located at the bottom thereof. The tail surface 25 is shaped to extend about the end of the fuselage 20 and has a pair of inwardly directed axially aligned tubular members 81 extended into the fuselage 20 from opposite sides of the vertical slot 78. The tubular members 81 are arranged in axial alignment with tubular trunnions 82 which extend from diametrically opposite sides of a rod 83 which extends parallel to the longitudinal axis of the fuselage 20. A rod 84 extends from side to side of the tail surface 25 and passes through the tubular trunnions 82 and through the tubular members 81 of the tail surface 25. The rod 84 has a force fit in the tubular members 81, but rotatively extends through the tubular trunnions 82 of the rod 83 permitting movements of the tail surface 25 in the directions indicated by the dot and dash lines 25′ in Fig. 1.

The rear end of the rod 83 is rotatively supported in a bearing 85 formed intermediate the ends of a support brace 86 extended diametrically across the cone-like end portion 79. The front end of the rod 83 is supported in spaced bearings 87 mounted on the upper ends of arms 88 which extend vertically from L-shaped brackets 89 mounted between the sides of the main portion of the fuselage 20. The bearings 87 are preferably of the thrust type, as is generally known in the art, to hold the rod 83 against longitudinal movement.

Manually operable control means is provided for turning the rod 83 to move the tail surface in the vertical plane extended laterally of the fuselage 20, as illustrated by the dot and dash line 25″ in Fig. 3.

The manual control means is comprised of a tubular shaft 90 rotatively supported in a bearing 91 supported upon a fixed portion of the fuselage 20 adjacent the pilot's seat. The top end of the tubular shaft 90 is provided with a control handle 92. The bottom end of the tubular shaft 90 is rotatively supported upon an L-shaped support 93 extended laterally across the fuselage and above the support 93, the tubular shaft 90 is provided with a bevel gear segment 94. The gear segment 94 in turn meshes with a bevel pinion 95 fixedly mounted upon a horizontal shaft 96 having its front end rotatively supported in a bearing 97 mounted on the L-shaped support 93 and its rear end rotatively extended through a bearing 98 mounted upon the foremost of the pair of brackets 89.

Beyond the bearing 98, the shaft 96 fixedly carries a sprocket 99 over which there extends a continuous chain 100. The chain 100 in turn extends over a sprocket 101 mounted on the rod 83 between the bearings 87. Thus, as the handle 92 is turned in one direction or the other, the rod 83 will be similarly turned through the medium of the gears 94 and 95, the shaft 96, the sprockets 99 and 101 and the chain 100 engaged over those sprockets, and turn the tail surface 25 to the position illustrated by the dot and dash lines 25'' in Fig. 3. It is pointed out that the dot and dash line position 25'' of Fig. 3 is a somewhat exaggerated position, as the tail surface 25 is retained from assuming a true vertical position by contact with the strap 80 which connects the cone-like end portion 79 to the main portion of the fuselage 20.

Figure 12:
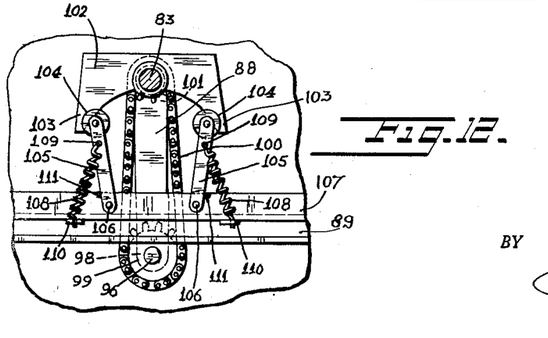
Fig. 12 is a partial transverse vertical sectional view taken on the line 12—12 of Fig. 11.

Neutralizing means is provided in connection with the rod 83 for holding the tail surface 25 in a neutral horizontal position extended laterally of the fuselage 20. Details of the neutralizing means are illustrated in Figs. 11 and 12 and comprises a flat member 102 mounted intermediate of its ends fixedly upon the rod 83 rearward of the bearings 87. The ends of the flat member 102 are formed with downturned portions 103. Flanged rollers 104 are engaged in the junction of the downturned portions 103 with the bottom edge of the flat member 102 and are rotatively supported upon the top ends of pairs of arms 105. There is a pair of arms 105 for each of the rollers 104 and the arms of each pair are located on opposite sides of the rollers 104. The bottom ends of the arms 105 are pivotally attached by means of pins 106 to the upstanding arms of a U-shaped channel 107 which extends across the fuselage 20. Contraction springs 108 operate between pins 109 mounted on the arms 105 adjacent the top ends thereof and lugs 110 which extend from the sides of the bottom of the U-shaped channel 107. These springs 108 draw the arms 105 outwards into contact with stop members 111 mounted on the U-shaped channel 107 adjacent the outer edge of each of the arms 105. The stop members 111 limit outward pivoting of the arms 105 and retain the arms in pivoted positions in which the flanged rollers 104 will be engaged in the junction of the downturned portions 103 with the bottom edge of the flat member 102 as clearly shown in Fig. 12. In this position, the tail surface 25 is in its neutral horizontal position extended laterally of the fuselage 20 of the aircraft.

When the rod 83 is turned in one direction or the other for turning the tail surface 25 the downturned end portion 103 on one side of the flat member 102 will move away from its flanged roller 104; however, the springs 108 operating on the arms 105 of that flanged roller 104 will be restrained from pulling the arms 105 outwards by reason of the engagement of the outer edges of those arms 105 with the respective stop members 111. Simultaneously, the downturned end portion 103 at the other end of the flat member 102 will pivot its respective arms 105 inwards loading the respective springs 108 to return the rod 83 and in turn the tail surface 25 to its neutral horizontal position when the turning torque on the rod 83 is released.

Figure 13:
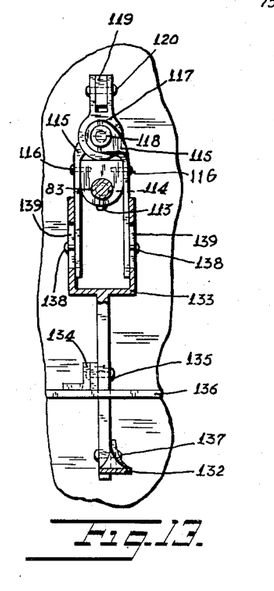
Fig. 13 is a partial transverse vertical sectional view taken on the line 13—13 of Fig 11.
Figure 14:
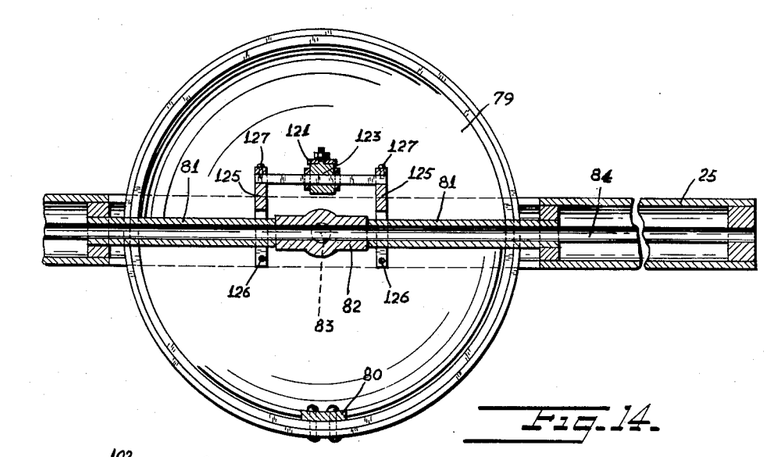
Fig. 14 is a partial transverse vertical sectional view taken on the line 14—14 of Fig. 11.

Manually operable controls are also provided for turning the tail surface 25 in a vertical plane extended longitudinally of the fuselage 20, as illustrated by the dot and dash lines 25' in Fig. 1. Details of this latter-mentioned manual control are illustrated in Figs. 11, 13 and 14 and comprise a block on the rod 83 rearward of the flat member 102. This block 112 is rotatively but non-slidably mounted on the rod 83 so as not to interfere with rotations of the rod for turning the tail surface in the vertical plane extended laterally of the fuselage. More particularly, the block 112 is provided with a radially inwardly extending pin 113 which engages a circular groove 114, see Fig. 13, formed in the rod 83.

Extended along the sides of the block 112 there is a pair of vertical levers 115 pivotally supported intermediate of their ends upon the sides of the block 112 by means of pins 116. The top ends of the levers 115 are bent to extend along the front and rear faces of the bottom portion of a link 117, which is pivotally attached to the top ends of the levers 115 to pivot in a plane extended transverse of the fuselage 28, by a pivot pin 118. The top end of the link 117 is bifurcated to receive the front end of a horizontal link 119. The link 119 is pivotally attached to the link 117 to pivot in a vertical plane, by a pin 120.

The rear end of the link 119 is bifurcated to receive the front end of a rearwardly extending link 121. The link 121 is pivotally attached to the link 119 to pivot in a horizontal plane by a pin 122. The rear end of the rearwardly extending link 121 is pivotally attached to a lug 123 rotatively but non-slidably mounted upon an intermediate portion of a rod 124. The rod 124 is disposed above the rod 84 and extends parallel thereto. Spaced vertically extending arms 125 having their lower ends bifurcated, see Figs. 11 and 14, for engagement over the inner ends of the tubular members 81. Screws 126 are threaded through the bottom ends of the arms 125 for securing them in fixed positions upon the inner ends of the tubular members 81. The upper ends of the arms 125 are formed with openings for receiving the ends of the rod 124 which are securely mounted in position within the openings of the arms 125 by means of rivets 127.

Thus, when the levers 115 are pivoted in one direction or the other, the tubular members 81 will be turned, through the medium of the interposed links, relative to the rod 84 for turning the tail surface in either of the two directions indicated by the dot and dash lines 25' in Fig. 1 to control ascending and descending of the aircraft under normal flight conditions. The pivotal connections of the ends of the rearwardly extending link 121 and the pivotal connection of the lower end of the link 117 to the top ends of the levers 115 permit a free movement of the tail surface 25 in the vertical plane extended laterally of the fuselage 20 under influence of the turning of the rod 83, as previously described. Under such turning influences, the rearwardly extending link 121 assumes various angular pivoted positions between the link 119 and the lug 123 which tends to shorten the straight line distance which extends parallel to the longitudinal axis of the fuselage 20, between the link 119 and the lug 123 imposing a slight turning motion on the tail surface 25 in the vertical plane extended longitudinally of the fuselage 20; however, this can be compensated for by the pilot, and more particularly by pivoting the levers 115 as will become clear as this description proceeds.

Rotatively but non-slidably extended through the tubular shaft 90 there is a shaft 128, the top end of which is provided with a control handle 129. The bottom end of the shaft 128 has fixedly attached thereto a radially extending link 130, The outer end of the radially extending link 130 is pivotally attached by a pivot pin 131 to the front end of a rearwardly extending connector bar 132. A vertical forked member 133 is pivotally supported intermediate of its ends upon a bracket 134, by a pin 135. The bracket 134 is in turn supported upon a support 136 extended transversely of the fuselage 20. The lower end of the forked member 133 is pivotally attached to the rear end of the rearwardly extending connector bar 132, by a pivot pin 137.

The bifurcated end of the forked member 133 has its arms extending along the lower ends of the levers 115. Each of the levers 115 is formed with an outwardly extending trunnion 138 which slidably extends through a vertical slot 139 formed in the respective arm of the bifurcated end of the forked member 133. Thus, as the control handle 129 is moved in one direction or the other, the connector bar 132 will be moved forwards and rearwards to correspondingly pivot the forked member 133 and reversely pivot the levers 115 and ultimately move the tail surface 25 in the vertical plane extended longitudinally of the fuselage 20.

The operation of the invention is as follows:

Under normal operating conditions, the aircraft moves through the air under the influence of the forward thrust created by the rotating propeller 26 and with the wings 24 operatively extended laterally from the sides of the fuselage 20. The pilot moves the control handles 92 and 129 to control movements of the tail surface 25 to control both banking and turning of the aircraft and vertical ascent and descent thereof. Under these normal operating conditions, the rotor 30 is inoperative.

In the event something goes wrong with the aircraft rendering it impossible to continue flight under the influence of the propeller 26, the pilot immediately shuts off the motor (not shown) which rotates the propeller 26 and energizes the motor 28 to rotate the rotor 30. This converts the aircraft into one of the helicopter type, and it is therefore necessary for the pilot to move the wings 24 to their inoperative position depended along the sides of the fuselage 20, as illustrated by the dot and dash lines 24' in Figs. 1 and 2. To accomplish this, the pilot first turns the handle 55 to rotate the shaft 48 in a direction to cause the dogs 50 to engage the free ends of the latch members 43 and pivot the same against the holding action of the contraction springs 46 disengaging the latch members 43 from the latch cutouts 45 in the lower ends of the struts 37. This frees the struts 37 for downward movement in the openings 41 of the brackets 42. While the parts are in this position, the pilot closes the switch 62, see Fig. 10, to energize the solenoids 57 and draw downward on the struts 37. While the struts 37 are moving downwards the pilot turns the handle 55 back to its starting position to release the latch members 43 to snap into the latch cutouts 56, when the struts 37 reach their fully down position, and retain the struts 37 and in turn the wings 24 in their lowered position in which they will not interfere with the operation of the rotor 30. The aircraft may now be flown to its destination or a safe emergency landing may be made under the power of the rotating rotor 30. When on the ground, the wings 24 may be lifted to their normal position extended laterally from the sides of the fuselage 20.

Operation of the other parts of the present aircraft will be clear from the foregoing description and a further and more complete description of their operation is not believed to be necessary.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage.

2. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage.

3. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage, and contraction springs operating between free ends of said latch members and said fuselage urging said latch members into a position to retain engagement with said latch cutouts.

4. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage, and contraction springs operating between free ends of said latch members and said fuselage urging said latch members into a position to retain engagement with said latch cutouts, and means for manually moving said latch members against the action of said springs to move them clear of said latch cutouts to free said struts.

5. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage, and contraction springs operating between free ends of said latch members and said fuselage urging said latch members into a position to retain engagement with said latch cutouts, and means for manually moving said latch members against the action of said springs to move them clear of said latch cutouts to free said struts, said manual moving means comprising a shaft rotatively supported across said fuselage adjacent the other free ends of said latch members, dogs mounted on said shaft to turn therewith to engage the said other free ends of said latch members and turn said latch members against the action of said springs when said shaft is turned, and means for turning said shaft terminating in a manually rotatable handle within said fuselage.

6. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage; and manually controllable electrical means for drawing on said struts to lower said wings to their downward depended positions in the released positions of said latch members.

7. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising struts pivotally attached at their upper ends to the undersurfaces of said wings intermediate of their ends, brackets mounted on said fuselage and through which the lower ends of said struts extend, said struts having their lower ends formed with latch cutouts, and latch members pivotally mounted on said brackets for engagement with said latch cutouts for holding said struts in operative positions in which said wings extend laterally from the sides of said fuselage, said struts being also provided with latch cutouts adjacent their pivoted ends for engagement by said latch members in the depended positions of said wings for holding the wings in their depended positions.

8. In an aircraft, a fuselage, wings pivotally mounted on the sides of said fuselage to be movable between inoperative positions wherein said wings are depended along the sides of said fuselage and operative positions wherein said wings are laterally extended from the sides of said fuselage with their adjacent ends overlapped at the top of said fuselage, and means for supporting said wings in positions extended laterally from the sides of said fuselage, said supporting means comprising hooks pivotally mounted on the topmost of said overlapped ends of said wings and engageable with a fixed portion of said fuselage when said wings extend laterally from the sides of said fuselage, springs urging said hooks into inoperative positions, and screws on said fuselage arranged to be tightened against said hooks holding them in an operative position engaging the said fixed portion of said fuselage against the action of said springs.

JOHN MORTKA.

References Cited in the file of this patent

UNITED STATES PATENTS

| Number | Name | Date |
|---|---|---|
| 1,019,988 | Mullendore | Mar. 12, 1912 |
| 1,297,264 | Simms | Mar. 11, 1919 |
| 1,324,996 | Cartus | Dec. 16, 1919 |
| 1,721,598 | Karrasch | July 23, 1929 |
| 1,739,798 | McCrea | Dec. 17, 1929 |
| 1,761,444 | Jones | June 3, 1930 |
| 2,196,819 | Vanetta | Apr. 9, 1940 |
| 2,386,915 | Spittler | Oct. 16, 1945 |
| 2,469,919 | Fischer | May 10, 1949 |